United States Patent [19]

Rodi et al.

[11] Patent Number: 4,884,774
[45] Date of Patent: Dec. 5, 1989

[54] CABLE LEAD-THROUGH DEVICE

[75] Inventors: Anton Rodi, Leimen; Peter T. Blaser, Dielheim, both of Fed. Rep. of Germany

[73] Assignee: Heidelberger Druckmaschinen AG, Heidelberg, Fed. Rep. of Germany

[21] Appl. No.: 213,550

[22] Filed: Jun. 30, 1988

[30] Foreign Application Priority Data

Jun. 30, 1987 [DE] Fed. Rep. of Germany ....... 3721484
May 18, 1988 [DE] Fed. Rep. of Germany ....... 3816870

[51] Int. Cl.[4] .............................................. F16L 5/00
[52] U.S. Cl. .................................... 248/56; 248/68.1; 174/48
[58] Field of Search .......................... 248/68.1, 56, 65; 174/48

[56] References Cited

U.S. PATENT DOCUMENTS

| | | | |
|---|---|---|---|
| 1,133,976 | 3/1915 | Kraus | 248/68.1 |
| 2,355,742 | 8/1944 | Morehouse | 248/68.1 |
| 2,732,226 | 1/1956 | Brattberg | 248/68.1 X |
| 3,830,954 | 8/1974 | Caudill | 248/68.1 X |
| 4,291,195 | 9/1981 | Blomqvist et al. | 248/56 X |
| 4,702,444 | 10/1987 | Beele | 248/56 |

FOREIGN PATENT DOCUMENTS 3820458 12/1986 Austria .

| | | | |
|---|---|---|---|
| 811116 | 8/1951 | Fed. Rep. of Germany | 248/68.1 |
| 2431834 | 1/1976 | Fed. Rep. of Germany | 248/68.1 |
| 2727996 | 10/1978 | Fed. Rep. of Germany | . |
| 2829887 | 12/1983 | Fed. Rep. of Germany | . |
| 3715945 | 1/1988 | Fed. Rep. of Germany | . |
| 144630 | 10/1980 | German Democratic Rep. | . |
| 396126 | 1/1966 | Switzerland | 248/68.1 |

OTHER PUBLICATIONS

Pgs. A67 and A10 of Cable Glands and Accessories.

*Primary Examiner*—Alvin C. Chin-Shue
*Attorney, Agent, or Firm*—Herbert L. Lerner; Laurence A. Greenberg

[57] ABSTRACT

Cable lead-through device includes a frame-shaped mounting member open at one side thereof, a cable lead-through element formed of at least one substantially parallelepipedal block of foamed plastic material surrounding a respective cable and received in the mounting member, and a retaining member for locking the open side of the frame-shaped mounting member, the cable lead-through element having an outer dimension limited by the mounting member, the substantially parallelepipedal block being of one-piece construction and being formed with a bore extending along an axis of the block, as well as with a slit extending alongside the bore for accommodating a cable introducible therethrough into the bore.

5 Claims, 2 Drawing Sheets

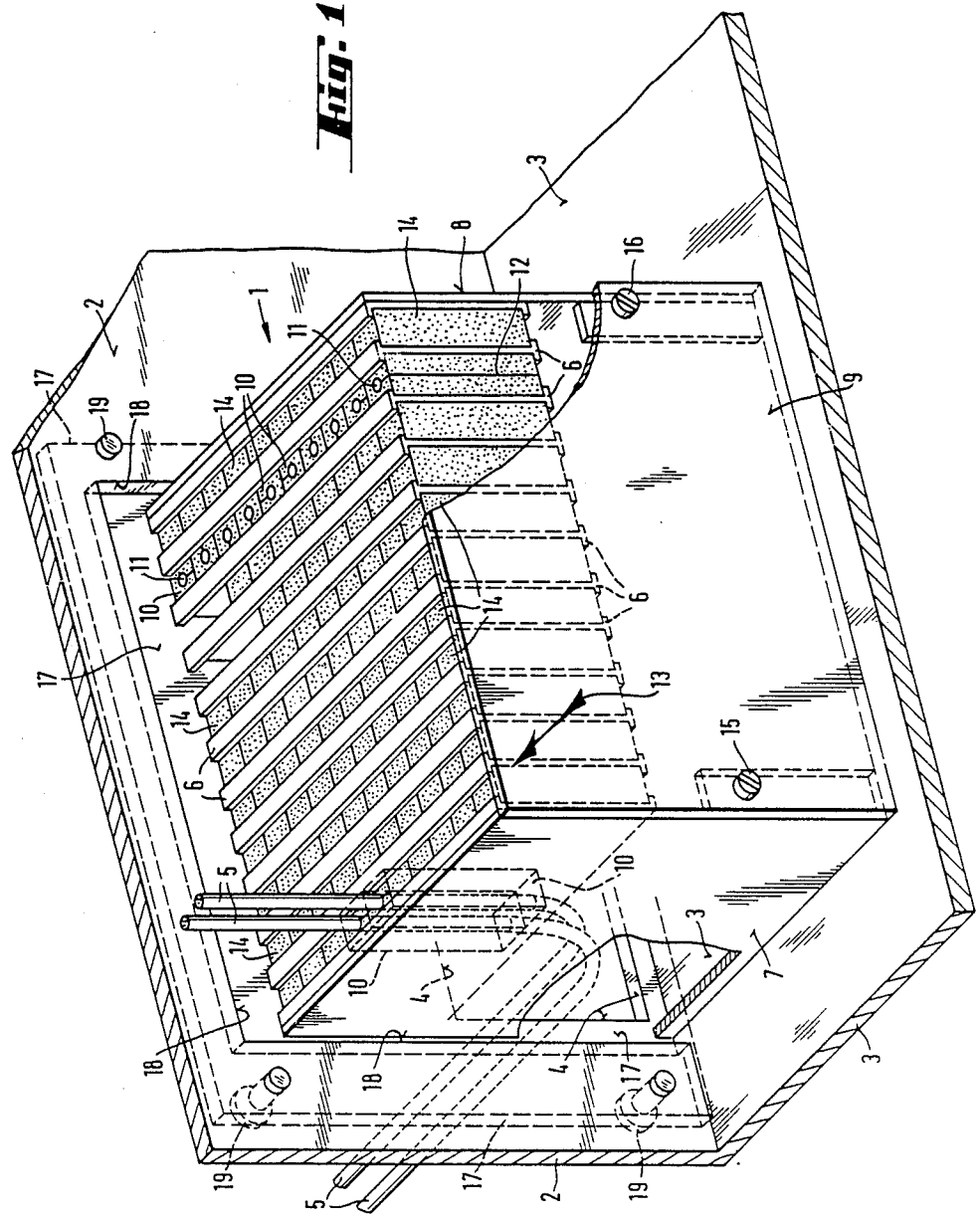

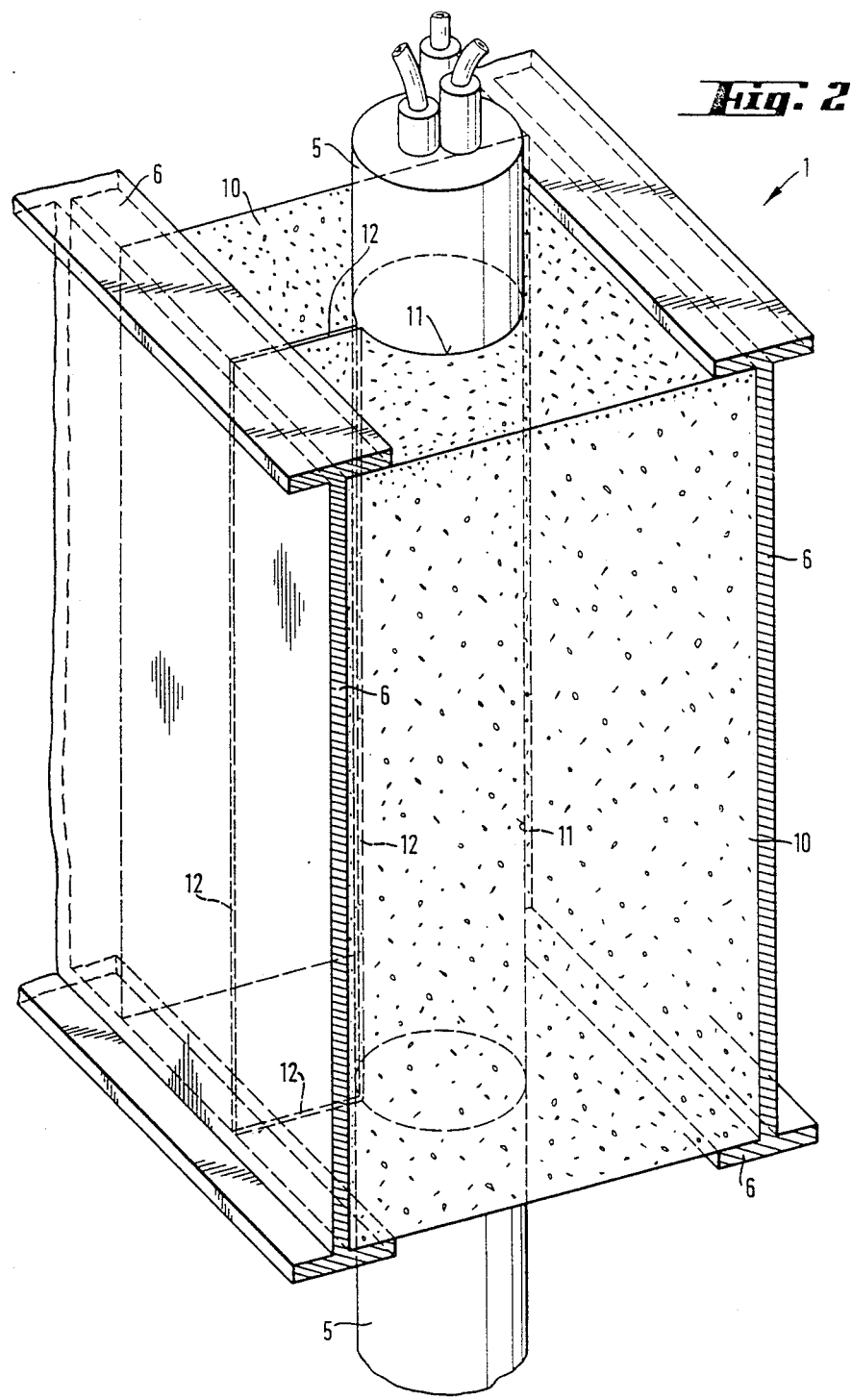

CABLE LEAD-THROUGH DEVICE

The invention relates to a lead-through or grommet device for cables. In order to guide cables through openings, such as in control panels or switch cabinets, for example, and to fix them in the openings, it has been conventional heretofore to use so-called armor-winding screw couplings or joints. Such screw couplings have a multiplicity of different sizes and are formed of two parts which are screwable into one another and which, after the cable has been passed through the opening, are introduced into the opening from both sides of the latter and are then screwed to one another.

A disadvantage of such heretoforeknown cable lead-throughs is that ready-made or prefabricated cables i.e. cables assembled with plugs or connecting elements, cannot be provided, after assembly thereof, with such cable lead-through so that such cable lead-throughs cannot be used therefor.

It is furthermore disadvantageous that two people are necessary for assembling such cable lead-throughs at a switch cabinet wall, which naturally increases assembly costs. It is thus a primary disadvantage if a multiplicity of cables have to be provided with cable lead-throughs. Moreover, armor-winding screw couplings require a great amount of space.

Austrian Pat. No. 382 045 discloses a lead-through device for cables with which a cable is enclosed by a parallelepipedal part formed of plastic material, and several parallelepipedal parts formed of plastic material are able to be arranged in a wall opening. A disadvantage of this device is that several encasing or sheathing parts are required for every cable. These encasing parts are connected to one another with clamps. This necessarily makes the assembly quite expensive.

It is accordingly an object of the invention to provide a cable lead-through or grommet device which avoids the foregoing disadvantages of the heretofore known devices of this general type, is low-priced and requires a minimum of time for assembly.

With the foregoing and other objects in view, there is provided, in accordance with the invention, a cable lead-through device comprising a frame-shaped mounting member open at one side thereof, a cable lead-through element formed of at least one substantially parallelepipedal block of foamed plastic material surrounding a respective cable and received in the mounting member, and a retaining member for locking said open side of said frame-shaped mounting member, said cable lead-through element having an outer dimension limited by said mounting member, said substantially parallelepipedal block being of one-piece construction and being formed with a bore extending along an axis of said block, as well as with a slit extending alongside said bore for accommodating a cable introducible therethrough into said bore.

A considerable advantage of the cable lead-through device according to the invention over conventional devices of this general type is that prefabricated cables having plugs of any size can be provided with the lead-through device of the invention, and the resulting assembly would require only a little more space than the cable itself. The parallelepipedal block through which the respective cable extends can be formed with a bore of varying size for accommodating cables of corresponding varying diameter without any change in the outer dimensions of the block.

Another advantage is that the respective cables can always be released and replaced, respectively, because, due to the fact that the cable is held securely fast in the block of the invention, it is unnecessary to provide an inseparable connection between the cable and the block, for example, by means of adhesive or by the addition of a sealing compound or the like.

In accordance with another feature of the invention, and in order to accommodate a plurality of cables guided by or extending through the lead-through device, the mounting member is of such dimensions as to accommodate a plurality of the blocks for guiding a plurality of cables, respectively, therein.

In accordance with a further feature of the invention, the mounting member is formed of at least two H-shaped frame elements extending parallel to one another in the form of tongues. Further in accordance with the invention, each of these frame elements have, respectively, an elongated central web and respective crosspieces at the ends thereof, at least the one block being disposable between the frame elements and being fixable in position at respective end faces of the block by the crosspieces.

It is also possible, in accordance with the invention, to arrange additional blocks for more cables or to remove cables and blocks, respectively, after previous assembly of the device. Furthermore, because a plurality of H-shaped frame elements are arranged as tongues adjacent one another, a partial exchangeability is possible i.e. all of the blocks between two adjacent tongues can be exchanged or can have the cables extending therethrough replaced by new cables. Moreover, instead of being H or double T-shaped, the frame element may have other guidance structures, such as a toothed or wave-shaped structure. These structures run in the direction in which the blocks are slid into the space between the frame elements when the device is being assembled. Assurance is thereby provided that, after the retaining member has been secured on the device of the invention, the blocks are fixed against displacement in any direction.

In accordance with yet another feature of the invention, the mounting member is formed of at least two frame elements extending parallel to one another for receiving the parallelepipedal block therebetween, the frame elements having respective toothed surfaces facing towards the block to prevent shifting of the block in axial direction of the bore.

In accordance with an alternate feature of the invention, the mounting member is formed of at least two frame elements extending parallel to one another for receiving the parallelepipedal block therebetween, the frame elements having respective waveshaped surfaces facing towards the block to prevent shifting of the block in axial direction of the bore.

In accordance with an added feature of the invention, the block has dimensions which are slightly greater than those of a respective space between adjacent parallel H-shaped elements so that, upon introduction of the block into the space and fastening of the retaining member, a clamping effect is exerted upon a cable extending through the block.

In accordance with an additional feature of the invention, the bore formed in the parallelepipedal block has a smaller diameter than that of the cable extending therethrough for securely retaining the cable against sliding in the bore.

In accordance with yet a further feature of the invention, the block is of such construction as to prevent entry of dust and splashed liquid into the device. The cable lead-through device according to the invention thus meets the requirements of the German protective standards, namely IP 54 and can, especially, be installed in switch cabinets which must comply with this standard.

In accordance with another development, in addition to a number of the aforedescribed blocks of respective cable lead-through elements of the device which are arranged adjacent one another and which have cables extending therethrough, so-called blind or dummy blocks are also provided which do not have any cables extending therethrough i.e. these dummy blocks have no bore or have a bore which is closed by an auxiliary element. By providing blind or dummy plugs, it is thus possible to add cables afterwards in an especially simple manner.

In accordance with yet another feature of the invention, therefore, there are thus provided a multiplicity of the H-shaped frame elements arranged mutually parallel to and adjacent one another, a multiplicity of the blocks formed with bores and slits being disposed in some spaces between the frame elements, and additional parallelepipedal blocks like the first-mentioned blocks but of uniformly solid construction i.e. without the bores and slots formed therein or with them suitably filled, being disposed in the remaining spaces between the frame elements which are not occupied by the first-mentioned blocks.

In accordance with a concomitant feature of the invention, a plurality of the blocks are combined to form a compound block formed with a plurality of the bores and having a plurality of the elongated slits, respectively, connected thereto.

Other features which are considered as characteristic for the invention are set forth in the appended claims.

Although the invention is illustrated and described herein as embodied in a cable lead-through device, it is nevertheless not intended to be limited to the details shown, since various modifications and structural changes may be made therein without departing from the spirit of the invention and within the scope and range of equivalents of the claims The construction and method of operation of the invention, however, together with additional objects and advantages thereof will be best understood from the following description of specific embodiments when read in connection with the accompanying drawings, in which:

FIG. 1 is a perspective view of a switch cabinet having installed therein a cable lead-through device constructed in accordance with the invention; and FIG. 2 is a fragmentary perspective view of the cable lead-through device of FIG. 1 showing in detail an element thereof.

Referring now to the drawing and, first, particularly to FIG. 1 thereof, there is shown a cable lead-through device 1 according to the invention installed in a switch cabinet of which only a rear wall 2 and a bottom 3 are visible. The cable lead-through device 1 projects from the outside through a recess 18 formed in the rear wall 2 into the switch cabinet and is fastened to the rear wall 2 of the switch cabinet by screws or bolts 19 extending through a rear wall 17 of the cable lead-through device 1 which projects on all sides thereof beyond the cross section of the recess 18. The cable lead-through device 1 can thus be withdrawn rearwardly i.e. in the direction of the arrow 13, out of the switch cabinet. It is consequently possible to assemble all of the cables in the switch cabinet before the cable lead-through is installed. The cable lead-through device 1 has an opening 4 formed in its rear wall 17 through which the cables 5 are introduced into the lead-through device 1. The cable lead-through device 1 contains a multiplicity of double-T or H-shaped frame elements 6 which are fastened in a tongue-shaped manner to the rear wall 18 of the cable lead-through device 1. The entire cable lead-through device 1 is enclosed by two side walls 7,8 and a detachable or removable end wall 9.

FIG. 2 shows one of the cable lead-through elements formed of a parallelepipedal block 10 of foamed synthetic or plastic material. The block 10 is provided with a bore 11 and a slit 12 extending along and connected to the bore 11. Before the block 10 is inserted between the respective frame elements 6, a cable 5 is introduced through the slit 12 into the bore 11. The diameter of the bore 11 is slightly smaller than the outer diameter of the cable 5, so that a clamping effect is produced on the cable 5. This clamping effect is amplified all the more by the fact that the block 10 becomes compressed when it is inserted between the frame elements 6 when the dimensions of the block 10 and the spacing between frame elements 6 are suitably selected.

The blocks 10 provided with the cable 5 are inserted between the respective frame elements 6 in the direction of the arrow 13, and thus all of the intermediate spaces between the frame elements 6 are successively loaded with the blocks 10. If the cable box is not required to have a full capacity, so-called blinder dummy blocks 14 can be inserted into the remaining intermediate spaces in order to ensure sealing. These blind or dummy blocks 14 are formed of solid blocks or monoliths of foamed material. After all of the intermediate spaces between the frame elements 6 have been filled, the end wall 9 is then fastened to the cable lead-through device 1 by threaded connections 15, 16. The purpose thereof is to seal the switch cabinet from the opening 4 and, moreover, to further increase the clamping effect upon the cables 5 by exerting a compressive force upon the blocks 10. Because the cables 5 extend perpendicularly or vertically out of the cable lead-through device 1 into the switch cabinet, the cables 5 can be connected relatively easily to plug connections or the like within the switch cabinet.

It is believed to be readily apparent from the foregoing description of the figures that, with the cable lead-through device 1 according to the invention, an especially rapid and reliable insertion of one or more cables into a switch cabinet is possible, no tool whatsoever being necessary to effect the assembly. By suitably selecting the diameter of the bore 11, nearly every possible cable can be fastened with the cable lead-through device 1 according to the invention. It is also possible, for example, to extend a flat cable through a suitably shaped bore and, thereby, use the cable lead-through device of the invention also for such a cable.

There are claimed:

1. Device for leading cables through an opening formed in a housing wall into the interior of a housing, comprising a rear wall plate releasably fastened to the housing wall and overlapping the opening formed therein; at least two mutually parallel web plates defining a space therebetween and extending perpendicularly to said rear wall plate, said web plates having respective foot ends firmly connected to said rear wall plate, and having respective head ends projecting into the interior of the housing; a multiplicity of filler members of mutually equal size formed of elastic material and having a parallelepipedal shape, said parallelpipedal filler members being disposed with respective side surfaces thereof adjacent one another and formed in rows extending consecutively head end to foot end thereof and filling said space between said web plates; at least a plurality of said filler members being formed with a longitudinal bore extending parallel to said rear wall plate for holding a cable therein, and with a longitudinal slot extending from one of the sides of said filler members to the respective longitudinal bore formed therein for facilitating the introduction of cables into the respective longitudinal bores; hold-back means provided at said web plates for fixing said filler members against movement in longitudinal direction of said longitudinal bores; an end wall closure plate connected by releasable fasteners to a respective head end of said web plates for clamping against one another said filler members disposed in said rows in said space between said web plates via a filler member projecting beyond said head end of said web plates; said rear wall plate being formed with an opening partly freeing said opening overlapped by said rear wall plate at the side of said foot ends of said web plates for freely admitting cables led therethrough into the interior of the housing.

2. Device according to claim 1 including a multiplicity of said web plates defining a multiplicity of spaces of mutually equal size therebetween, respectively, filled with said filler members.

3. Device according to claim 1, wherein the filler members disposed between respective pairs of said web plates are in a prestressed state between the respective web plates.

4. Device according to claim 1, wherein at least one of said filler members is a blinder dummy block formed of solid elastic material.

5. Device according to claim 1, wherein said rear wall plate, said two mutually parallel web plates and said end wall closure plate connected to said web plates form casing surfaces defining a chamber having a top surface closed by said filler members and an interior space partly filled by said filler elements, and including a bottom plate for closing a base surface of said chamber located opposite said top surface thereof; a part of said interior space of said chamber being free of said filler members and being accessible through said opening formed in said rear wall plate to a cable received in said filler members.

* * * * *